(12) United States Patent
Bernard et al.

(10) Patent No.: US 7,495,746 B2
(45) Date of Patent: Feb. 24, 2009

(54) OPTICAL METHOD AND DEVICE FOR MEASURING A DISTANCE FROM AN OBSTACLE

(75) Inventors: Stefano Bernard, Orbassano (IT); Nereo Pallaro, Orbassano (IT); Piermario Repetto, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 0 days.

(21) Appl. No.: 11/898,965

(22) Filed: Sep. 18, 2007

(65) Prior Publication Data
US 2008/0094607 A1    Apr. 24, 2008

(30) Foreign Application Priority Data
Oct. 24, 2006    (EP) .................................. 06425736

(51) Int. Cl.
*G01C 3/08* (2006.01)
(52) U.S. Cl. ..................................... 356/4.07
(58) Field of Classification Search ....... 356/3.01–3.15, 356/4.01–4.1, 5.01–5.15, 6–22
See application file for complete search history.

(56) References Cited
U.S. PATENT DOCUMENTS
6,496,754 B2 * 12/2002 Song et al. .................. 700/245

2003/0043363 A1 * 3/2003 Jamieson et al. ........... 356/5.01
2004/0008394 A1    1/2004 Lange et al.

FOREIGN PATENT DOCUMENTS
EP    36 18 624 A1    12/1987

* cited by examiner

*Primary Examiner*—Thomas H Tarcza
*Assistant Examiner*—Luke D Ratcliffe
(74) *Attorney, Agent, or Firm*—Nixon & Vanderhye P.C.

(57) ABSTRACT

An optical device to measure the distance between the device itself and an obstacle/object comprising a unit to emit radiation including an aligned series of sources of radiation coupled to a series of arrangements of lenses to guide the radiation emitted by the sources. An optical acquisition unit comprising a matrix of photodetectors has a field of view including the scene in front of the optical device and including the obstacle. The signals leaving the acquisition unit are sent to a control and processing unit for calculation of the distance from the obstacle. The unit for the emission and conformation of the radiation emits a beam having a transverse section of a form elongated along an axis that is progressively rotated for transverse sections of the beam progressively more distant from the emission unit. In this manner, the distance of the obstacle may be calculated on the basis of the angular position of the section of the beam intercepted by the obstacle, as acquired by said acquisition unit.

32 Claims, 18 Drawing Sheets

OPTICAL METHOD AND DEVICE FOR MEASURING A DISTANCE FROM AN OBSTACLE

BACKGROUND OF THE INVENTION

The present invention relates to optical methods and devices for measuring the distance from an obstacle. In particular, the invention concerns optical devices of the type comprising:
- a unit to emit radiation and to conform the irradiated beam,
- an acquisition unit to acquire optical information relating to the image of the scene in front of the optical device, and
- an electronic control unit to receive signals leaving the acquisition unit and to process them for the purpose of determining the distance between said optical device and an obstacle that is part of the scene in front of the optical device.

Techniques of the optical type to measure the distance from an obstacle may be subdivided into passive and active techniques. Passive techniques exploit the existing environmental illumination, whereas active techniques illuminate the scene with a source of radiation.

The most widely used passive technique, above all in robotics and industrial automation, is the so-called stereo technique, based on the use of two video cameras that observe the same portion of the scene from different angles.

Active techniques are however undoubtedly more robust and better adapted to conditions of high background light, or those of poor visibility.

Among the active techniques, the triangulation technique has been proposed for numerous different applications, both with a single beam and with structured light, for example in the form of a blade of light, scanning in one or two dimensions and observed from a direction at an angle with regard to the direction of projection. Triangulation enables the processing complexity to be reduced, but there are some limits to the precision that can be achieved.

Both the stereo technique and triangulation, indeed, become less precise for large distances between sensor and obstacle, taking into account that the accuracy depends on the relative sensor-sensor or source-sensor distance. Furthermore, measurement depends on calibration of the system, with a high sensitivity with regard to mechanical adjustments; all triangulation systems are extremely sensitive to misalignment.

For other applications that require detection in the medium/long range, such as automobile-related applications, active ranging techniques have been used, based on infrared sources (laser), with multiple beams or in some cases with a scanning beam operating in one or two dimensions. Techniques have also been proposed that are based on measuring the (direct or indirect) flight time with pulsed sources. For example, in US2004233416 a device is described to produce a three-dimensional image representing the distance of obstacles. The image is focused on a matrix of CMOS sensors and the distance is calculated by measuring the back-reflected signal of packets of pulses sent, out of phase by a few tenths of a nanosecond. Lastly, techniques have been proposed based on the measurement of the degree of phase displacement between emitted signal and reflected signal, with modulated sources of the sinusoidal type. As an example, a method is described in US2004008394 to acquire and demodulate electromagnetic waves modulated from the temporal standpoint by means of two micro-optical elements capable of focusing the same portion of the scene onto two distinct sensitive areas. In this way it is possible to measure, for example, the phase of a modulated signal and apply this technique in distance measurement systems by calculating the flight time. The sequential nature of the measurements connected to the scanning, the need to work with high frequencies (pulse duration less than a microsecond) and the high degree of complexity of the system are the principal disadvantages of these techniques for vehicle applications, whereas the chief advantage with regard to triangulation techniques lies in the greater ease of installation and calibration, as well as the greater accuracy in distance measurement for long obstacle distances. Prototype 3D vision systems (ranging cameras) are also in the development phase, for robotics and security applications. In such systems, a matrix of photodetectors, with appropriate processing electronics integrated at the pixel level, performs two functions in parallel on an entire image, detecting the scene and measuring the distance of objects.

SUMMARY OF THE INVENTION

The purpose of the present invention is to produce an optical device for measuring the distance from an obstacle, characterised by extreme simplicity of the device, together with extreme simplicity of the processing algorithms necessary to calculate the distance, as well as, lastly, being of lower cost than the solutions mentioned above.

In view of achieving these and further goals, the invention has as its object an optical device for measuring the distance from an obstacle, comprising the characteristics in claim 1.

The present invention also has as its purpose a method according to claim 32.

Thanks to the characteristics indicated above, the invention may be implemented with extremely simple and low-cost means, without thereby prejudicing the possibility of achieving precise and reliable distance measurement.

The device according to the invention lends itself to being utilised, for example, in automobile-related applications to measure the distance of a vehicle onto which it is installed from an obstacle, both to provide assistance in parking manoeuvres, and to activate safety devices immediately before a crash. The device according to the invention nevertheless also lends itself to other applications, for example as a portable device or as a stationary device for the surveillance of areas, for road infrastructure, etc.

BRIEF DESCRIPTION OF THE DRAWINGS

The invention will now be described and illustrated with reference to the attached drawings, provided as a simple example without limiting intent, in which.

DETAILED DESCRIPTION OF THE INVENTION

Figure 1:
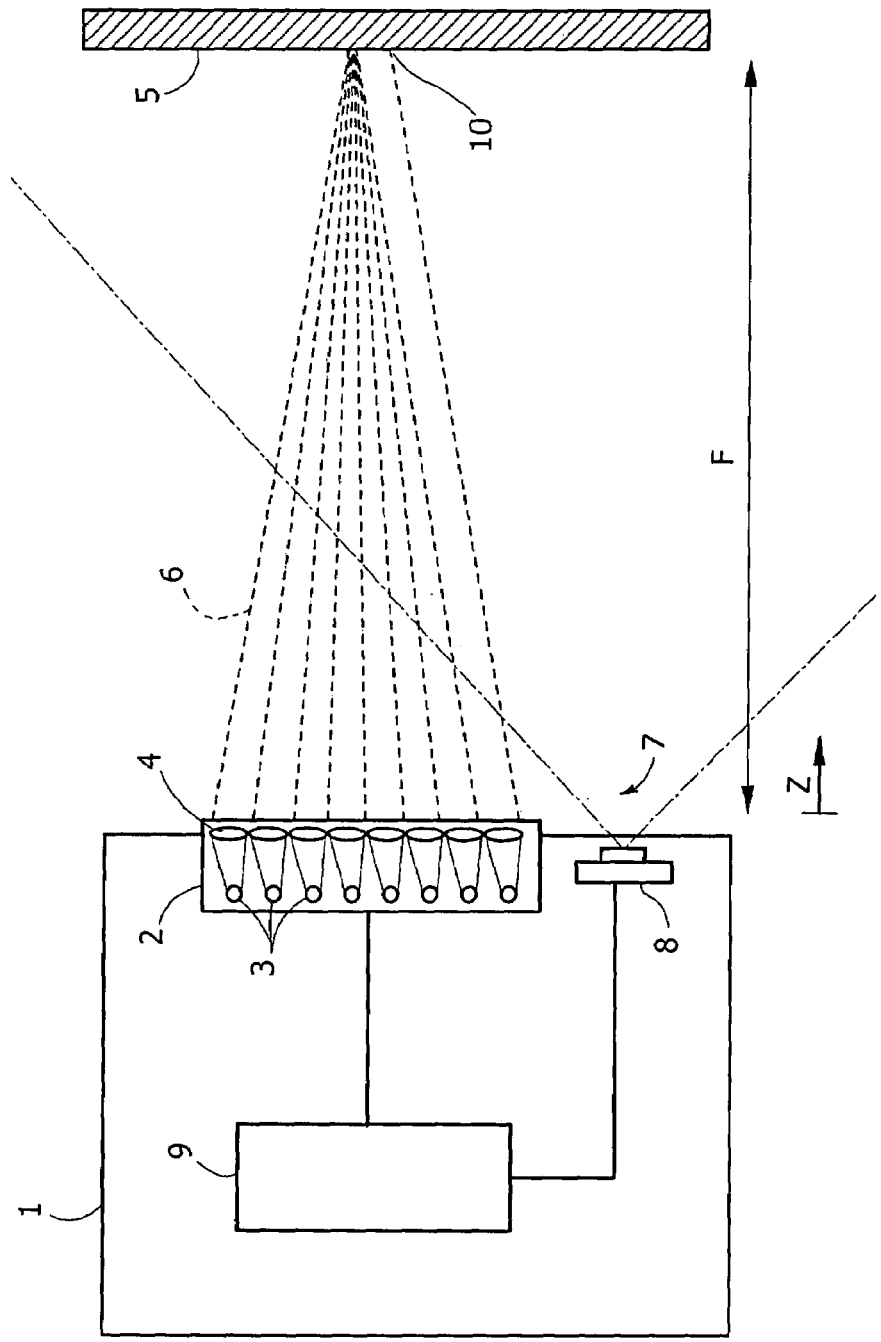
FIG. 1 is a plan view, in diagram form, of a first embodiment of the device according to the invention.
Figure 2:
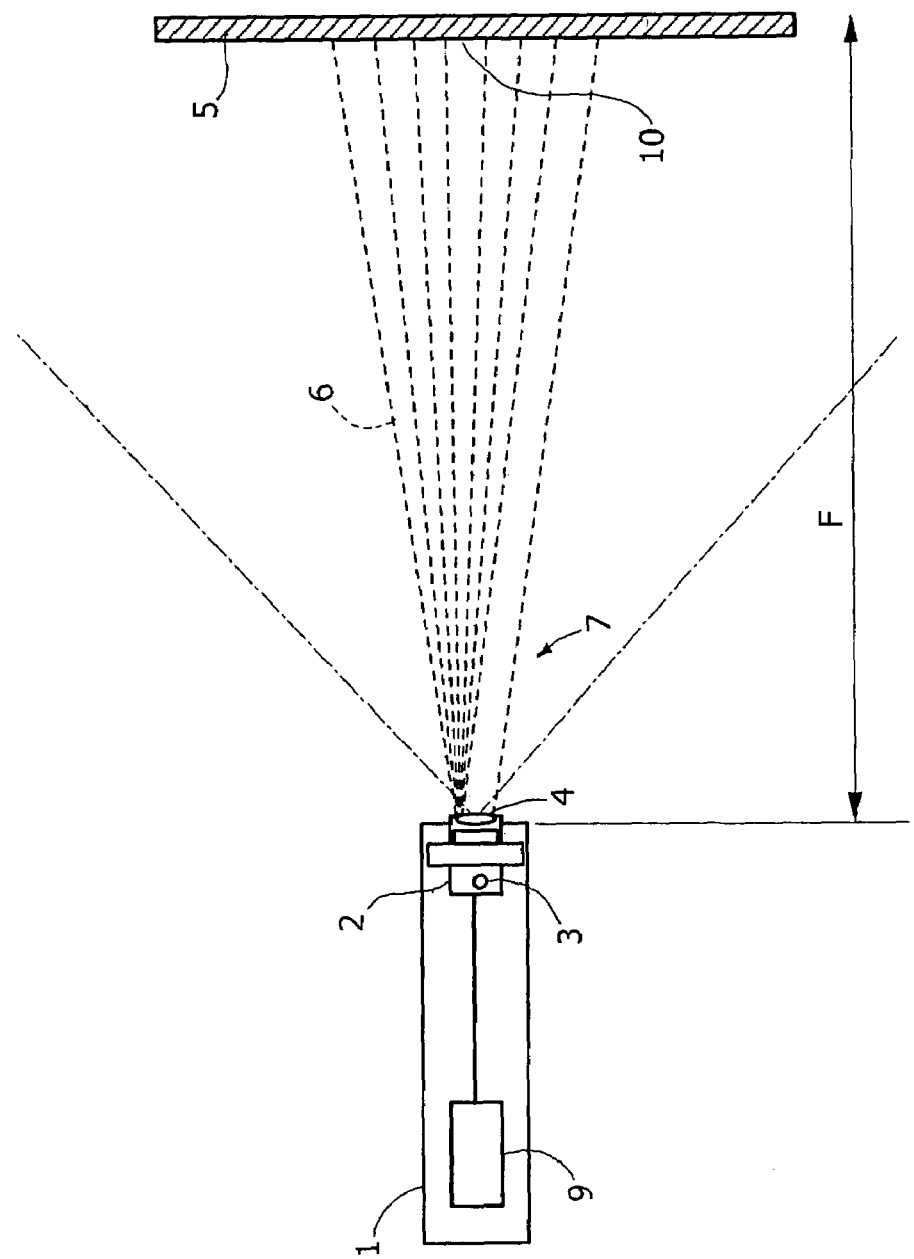
FIG. 2 is a side view, in diagram form, of the device in FIG. 1.
Figure 3:
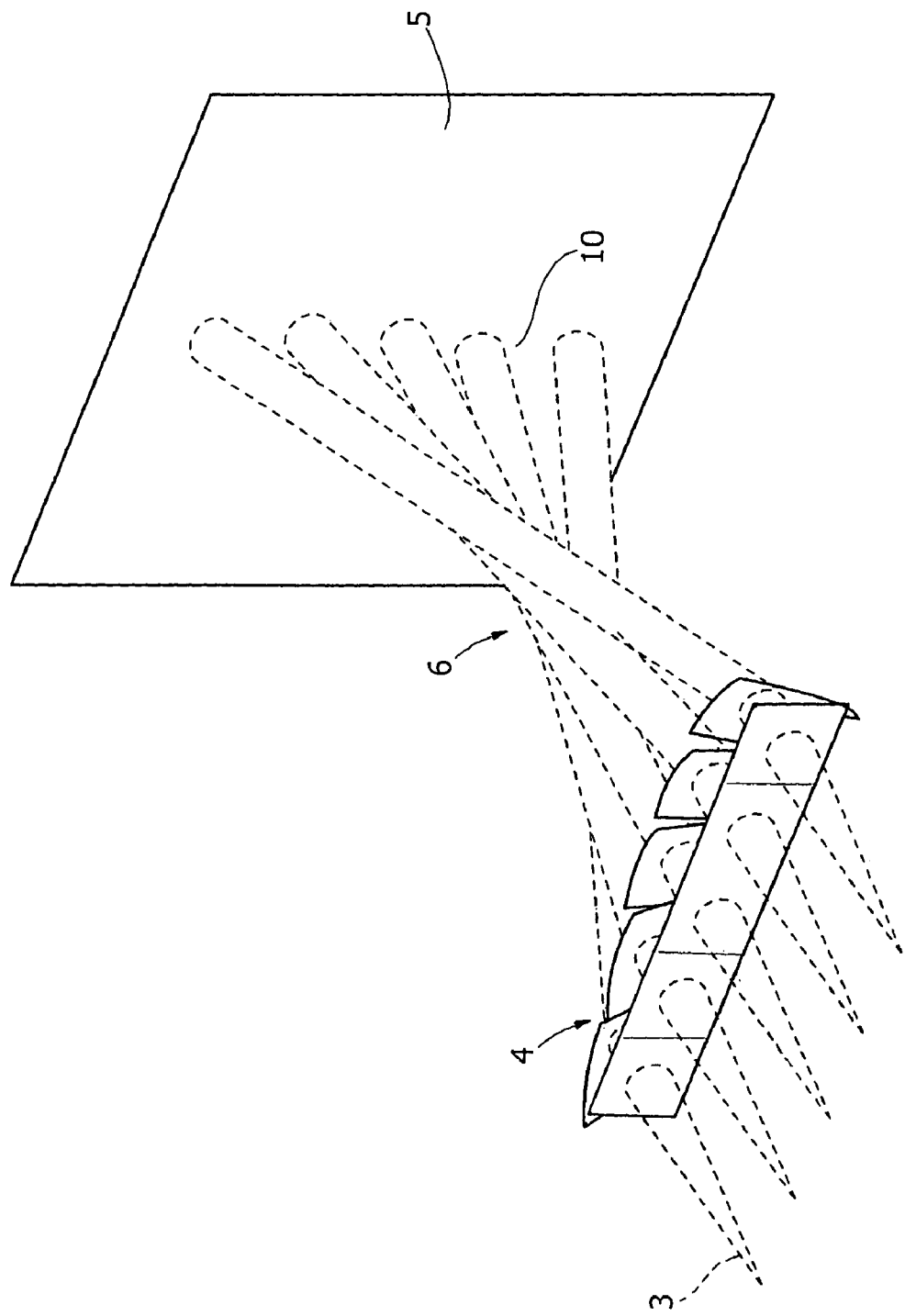
FIG. 3 is a three-dimensional view, in diagram form, of an optical simulation that shows the operating principle of the device in FIG. 1.

With reference to FIGS. 1-3, the optical device 1 according to the invention comprises an optical unit 2 that includes a device emitting radiation comprising a linear matrix of sources 3, for example diode lasers or LEDs with an emission peak preferably in the region of the near infrared spectrum (with wavelength between approximately 700 nanometers and 1100 nanometers). The sources 3 are coupled to optical means 4 capable of intercepting the radiation emitted by the sources 3 and of collimating the radiation leaving each individual source in a predetermined direction; the beam 6 produced by said optical means is thus in the form of a superimposition of beams substantially collimated such as to form, on a plane perpendicular to the plane of emission of the sources and at a predetermined distance F from those sources, a distribution of illumination comprising a matrix of spots arranged along a predetermined direction different from the direction of the line along which said sources are arranged (see also FIG. 4). In a limit case, the number of sources may be reduced to two, in such a manner that the beam 6 is comprised of two beams collimated in different directions and such as to form, on a plane situated at a predetermined distance z from the emitting unit 2, spots arranged along a predetermined direction that is different from the direction of the line along which the emitting sources are arranged. If the intensity of the sources 3 is sufficiently high and/or if the distance between the sources is fully compensated by the divergence of the beams leaving said optical means 4, the resulting distribution of illumination would be perceived as a continuous distribution rather than as a superimposition of isolated spots.

If the collimation of the beams leaving said optical means 4 is sufficiently good and the density of the sources is sufficiently high, the transverse section of the beam may thus be assimilated to a segment of straight line (see FIG. 4); the direction of that straight line also being different from the direction of the line along which said sources are arranged, the distribution of illumination resulting from the intersection of the emitted beam 6 with the plane transversal to the principal direction of the emitted beam 6 will be a straight line that, in transverse sections at progressively greater distances from the emission device 2, is progressively rotated.

Figure 5:
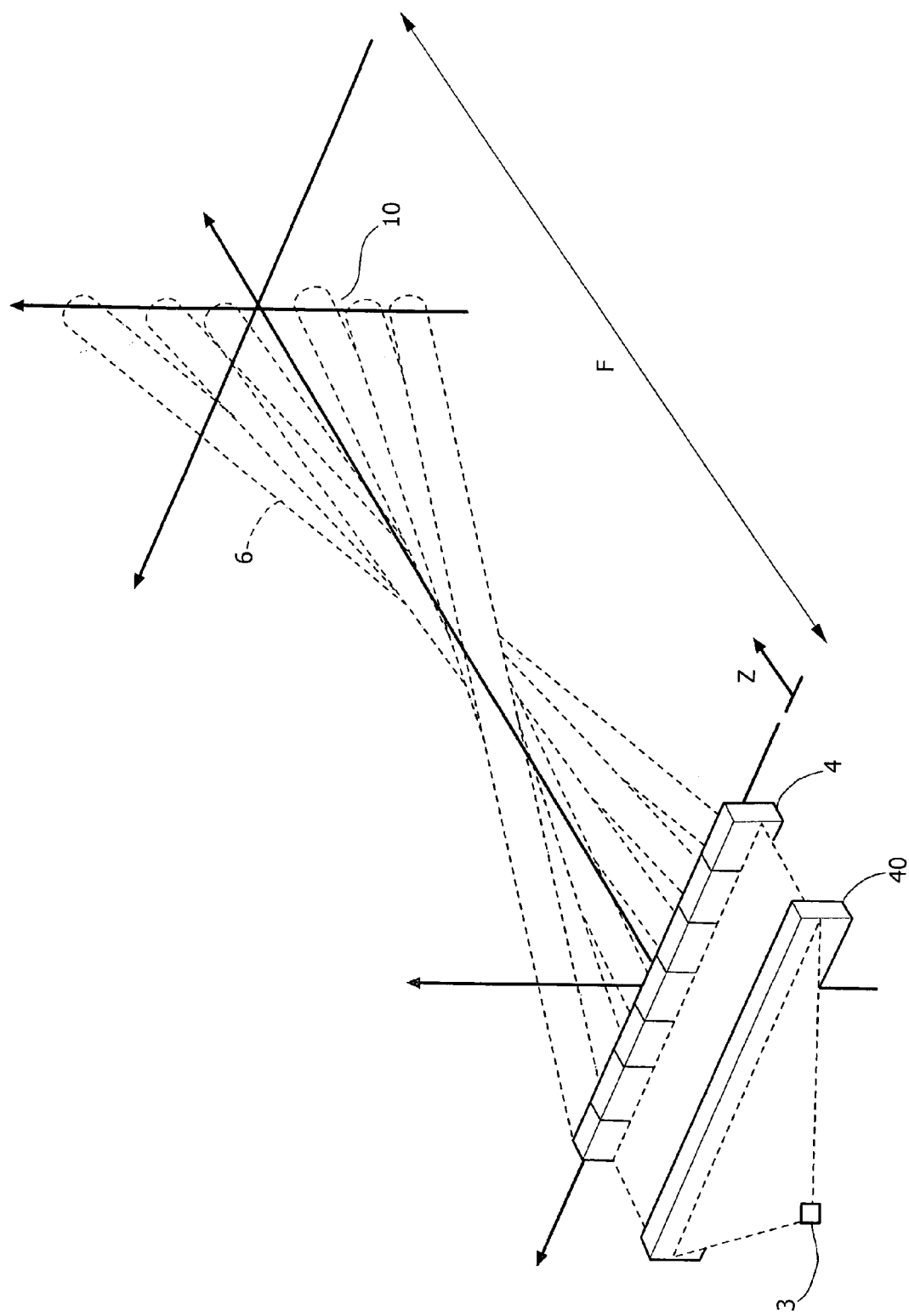
FIG. 5 shows a second embodiment having a substantially point-form source coupled with optical means 40 capable at the same time of collimating the beam and of extending the virtual dimension of the beam along one direction. Furthermore, further optical means 4 are capable of forming an outgoing beam 6 with the characteristics necessary for the device according to the invention.

With reference to FIG. 5, as an alternative to a linear matrix composed of a number of sources, it is possible to provide for a single source of radiation of a linear form from which light collimated in one direction is emitted; this may be achieved for example by using a substantially point-form light source coupled to appropriate optical means 40 capable at one and the same time of collimating the beam and of extending the virtual dimensions of the source along one direction. FIG. 5 shows the case in which the optical means collimate the radiation in a direction that is the same for all points of the linear source, whereby the linear source produced by said optical means 40 is coupled to further optical means 4 capable of forming an outgoing beam 6 with the above-described characteristics. Alternatively (FIG. 6) said optical means 40 may directly perform the function of collimating the radiation emitted from different points of the source in different directions in such a manner as to form an outgoing beam 6 with the above-described characteristics.

In a preferred embodiment, the segment 10 is rotated by 90° with respect to the direction of alignment of the sources 3 at a predetermined distance F.

The linear matrix of sources 3 may be extended along the horizontal or vertical direction and generate a vertical or horizontal segment of light at a predetermined distance, as may be seen in FIGS. 3-6.

The sources 3 may be piloted in a continual modality or may be modulated/pulsed, to increase the ratio between the useful signal (segment of light) and the background signal influenced by the ambient illumination.

The device 1 according to the invention also includes an optical acquisition unit 8 (FIG. 1) situated in proximity to the linear matrix of sources 3, with an optical system having a field of view 7 and such as to form on a detector or on a matrix of detectors an image of the distribution of illumination obtained as the intersection between the beam 6 and an obstacle 5 situated at a distance z that it is required to determine.

According to a preferred characteristic, the optical unit 8 is a vision system comprising a matrix of photodetectors, for example with CCD or CMOS technology, coupled to an image formation arrangement of lenses.

According to a further preferred characteristic, the acquisition unit includes means to filter the radiation reflected from the obstacles and incident on said acquisition means so as to transmit only the components of the spectrum corresponding to the radiation emitted from said emission unit, in order to increase the ratio between useful signal and background signal, as well as that between signal and noise According to a further preferred characteristic, the optical unit 8 consists of a single detector of linear form coupled to a focussing lens. The response of said detector will be maximum when the linear image of the distribution of illumination formed by the focussing lens on the plane of the detector is substantially aligned to the direction of extension of the detector, and will be minimum when said linear image is orthogonal to the direction of extension of the detector. The use of a single detector of linear form makes it possible to obtain direct information concerning the distance without needing to employ image processing techniques such as in the case of a CCD or CMOS matrix. The same effect may be achieved with a sensor of square or rectangular shape appropriately masked with a diaphragm having a linear slit, as will be explained in detail below.

Lastly, an electronic control and processing unit 9 synchronises the emission from the sources, in the case of modulated or pulsed operation, with the acquisition by the optical unit 8, and processes the image determining the distance measurement.

Figure 4:
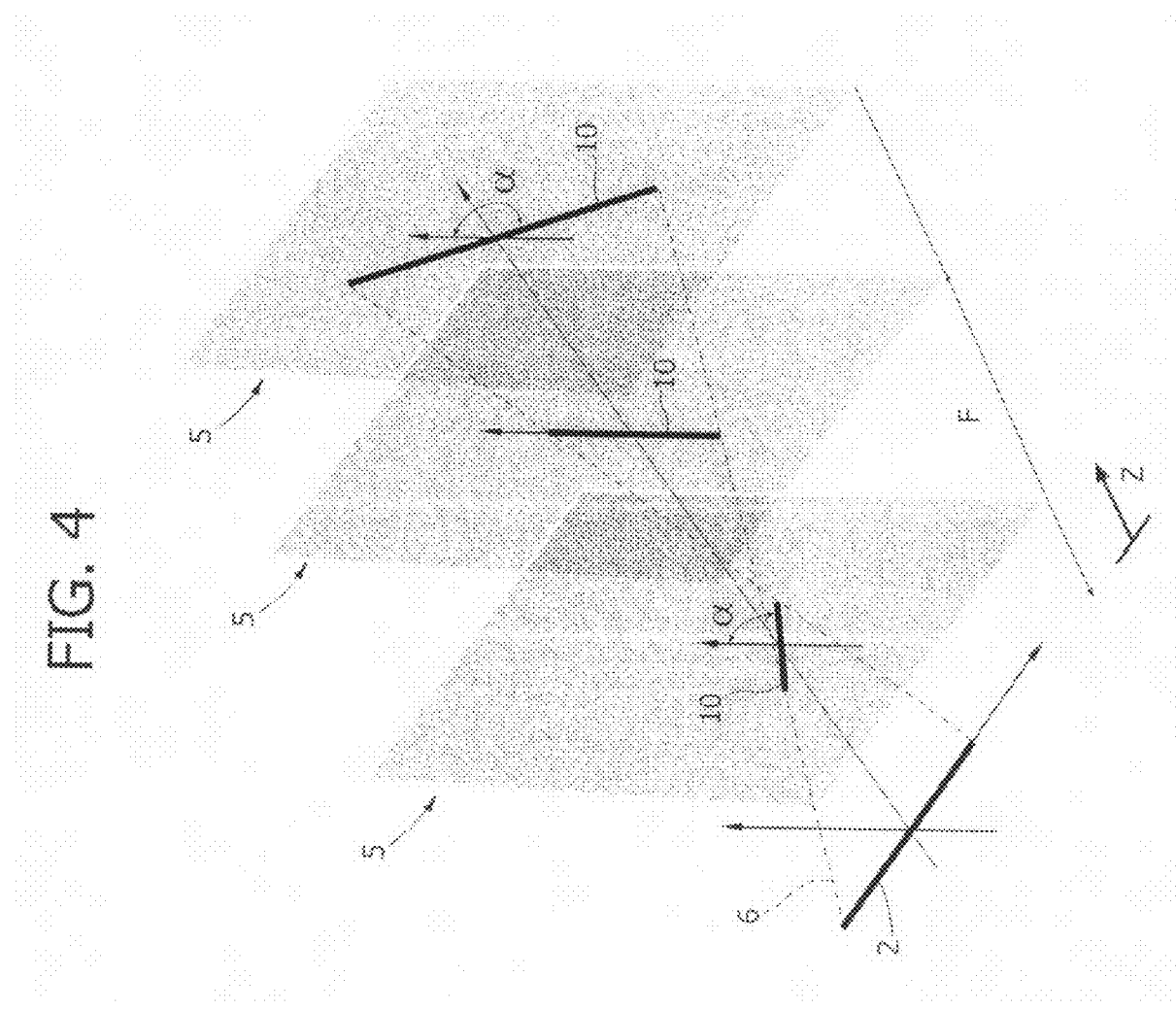
FIG. 4 is a further three-dimensional view, in diagram form, that shows the operating principle of the device in FIG. 1.

With reference to FIGS. 3 and 4, the operating principle of the optical device according to the invention is based on the fact that the sources 3, arranged for example horizontally, form at a predetermined distance F a distribution of light, with the conformation of a segment of light 10, rotated by 90°. As the distance $z$ between the sources of radiation 3 and the obstacle 5 varies, the intersection of the beams 6 emitted by the sources 3 with the obstacle forms a segment 10 inclined with an angle α with regard to the vertical that progressively varies as the distance from the obstacle varies.

The relation between the angle of inclination α and the distance of the obstacle depends on the relationship between the dimension of the segment 10 and the linear dimension of the source (or enlargement factor) at a predetermined distance F.

That is, if:

α is the angle of inclination,

F is the value of the predetermined distance, z is the distance at which the angle of inclination α is calculated, and M is the relationship between the dimension of the segment 10 and the linear dimension of the source (or enlargement factor), then the formula that connects these parameters is given by:

$$Tg(\alpha(z))=Mz/(F-z) \quad [1]$$

Figure 7:
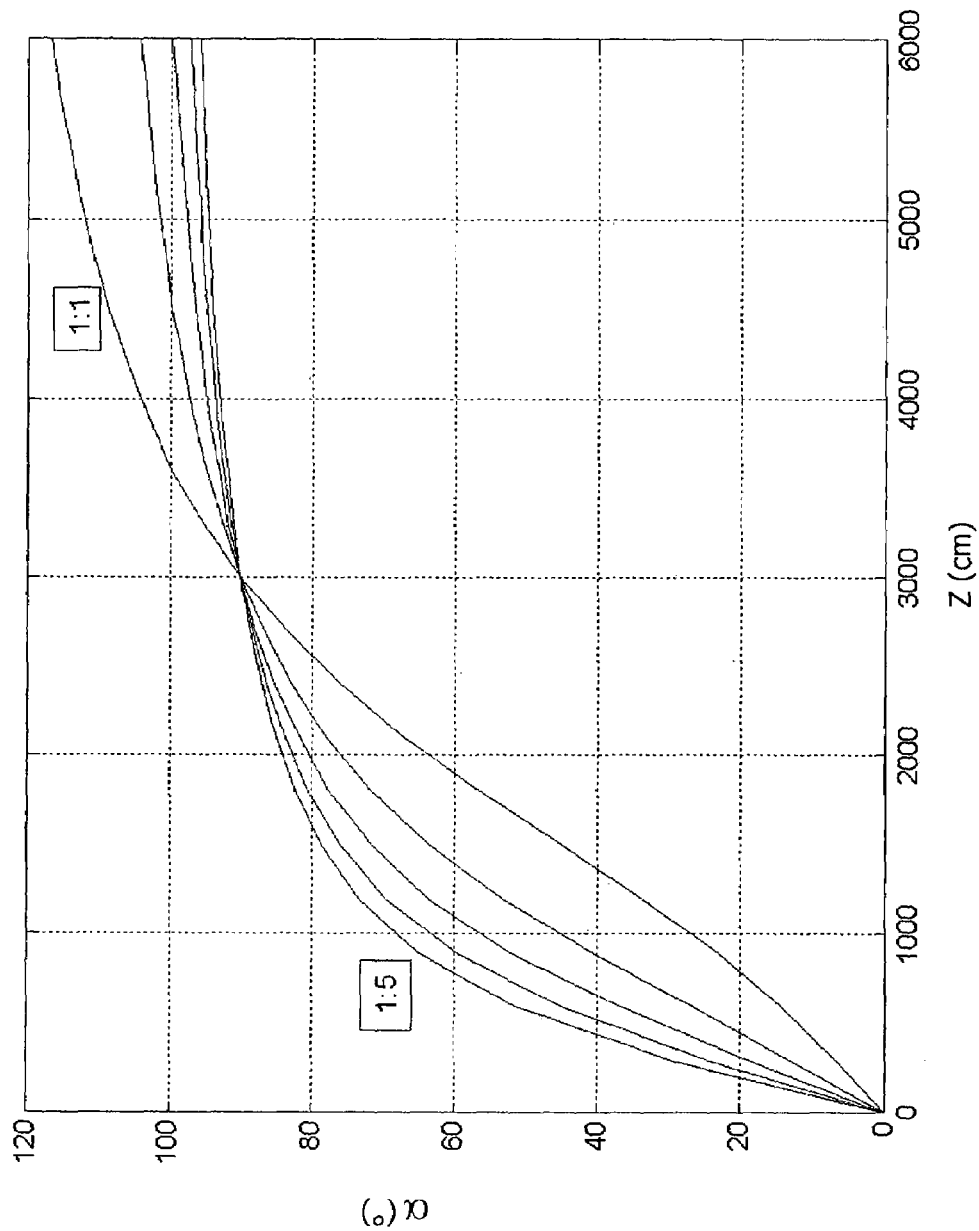
FIG. 7 is a diagram showing the variation of the angle of inclination of the transverse section of the irradiated beam, as a function of the distance from the emitting unit and as the ratio between size of source and size of beam section in correspondence with the plane in which the section is oriented vertically varies, in the case in which the plane is 30 m from the source and the source is 20 cm long.

FIG. 7 shows the variation of the angle of inclination α as a function of the distance, as the relationship between the dimension of the source and that of the segment of light varies, where this latter is vertical. This figure relates in particular to the case in which the dimension of the source is 20 cm and the segment of light becomes vertical at a distance of 30 m from the source.

As is clear in FIG. 7, linearity is maximum when said enlargement factor is equal to 1 and for distances of the obstacle between 0 and said predetermined distance F. It is equally interesting to note that the angle of inclination α reaches an asymptotic value.

If the distance F for which the inclination of the segment 10 reaches a predetermined value is known beforehand (in the examples in the figures mentioned above the predetermined value is 90°, corresponding to a vertical segment at a predetermined distance) and measuring the inclination α of the segment 10 in correspondence with the obstacle 5, the distance of the obstacle can be determined by resolving formula 1 for z:

$$z=Ftg(\alpha)/(M+tg(\alpha)) \quad [2]$$

The error ϵ in the distance measurement that can be detected depends on the minimum variation Δα of the angle of inclination α that the optical unit 8 coupled to the relative electronic control unit 9 is capable of measuring; this error varies in its turn with the distance z, since α does not depend in a linear manner on z (see FIG. 5). The relationship that connects ϵ to the distance is as follows:

$$\epsilon=d\alpha/dz=FM/(F-z)^2+(Mz)^2 \quad [3]$$

Figure 8:
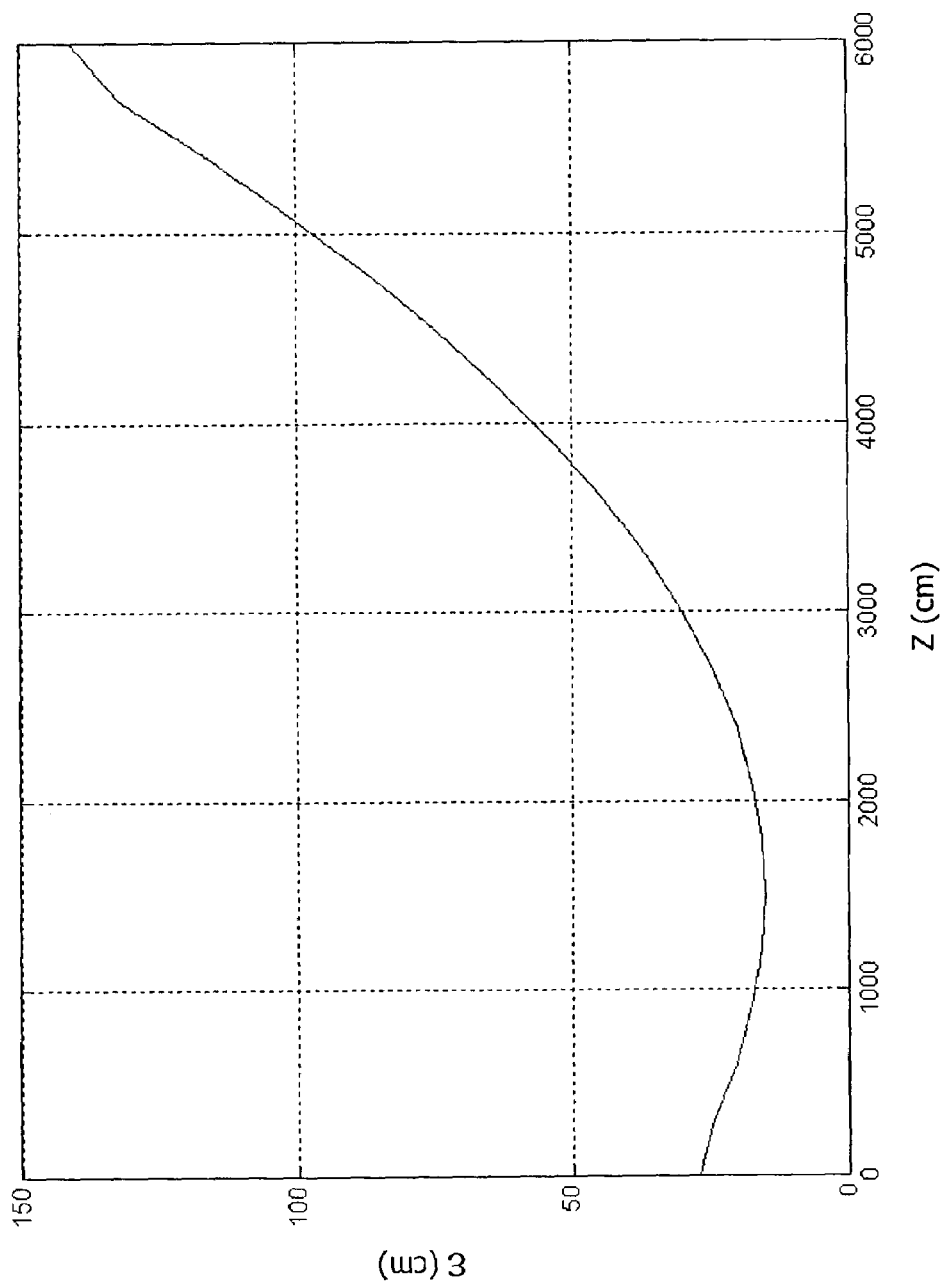
FIG. 8 shows the trend of the error $\epsilon$ in distance measurement as the distance itself varies, in the case in which the segment is of the same length as the source and is inclined by 90°, that is it is vertical, at a distance of 30 m.
Figure 9:
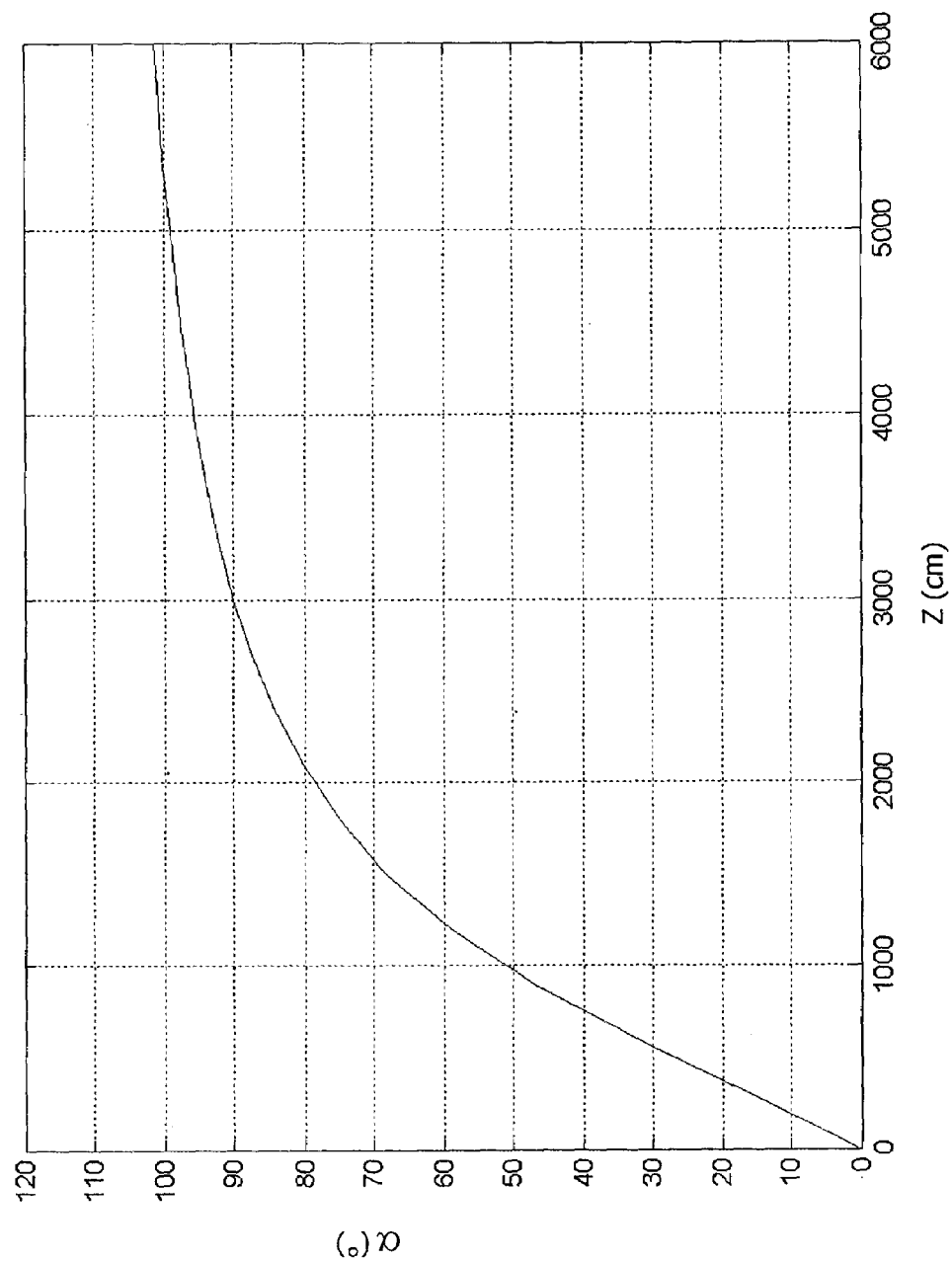
FIG. 9 is a diagram showing the variation of the angle of inclination of the transverse section of the beam as a function of the distance, for some determinant parameters.

Since the angle of inclination α reaches an asymptotic value, the error ϵ increases rapidly for distance values above the predetermined value F. FIG. 8 shows the trend of the error in the distance measurement in the case of M=1, supposing an uncertainty in measuring the angle of inclination α of 3 degrees.

Figure 6:
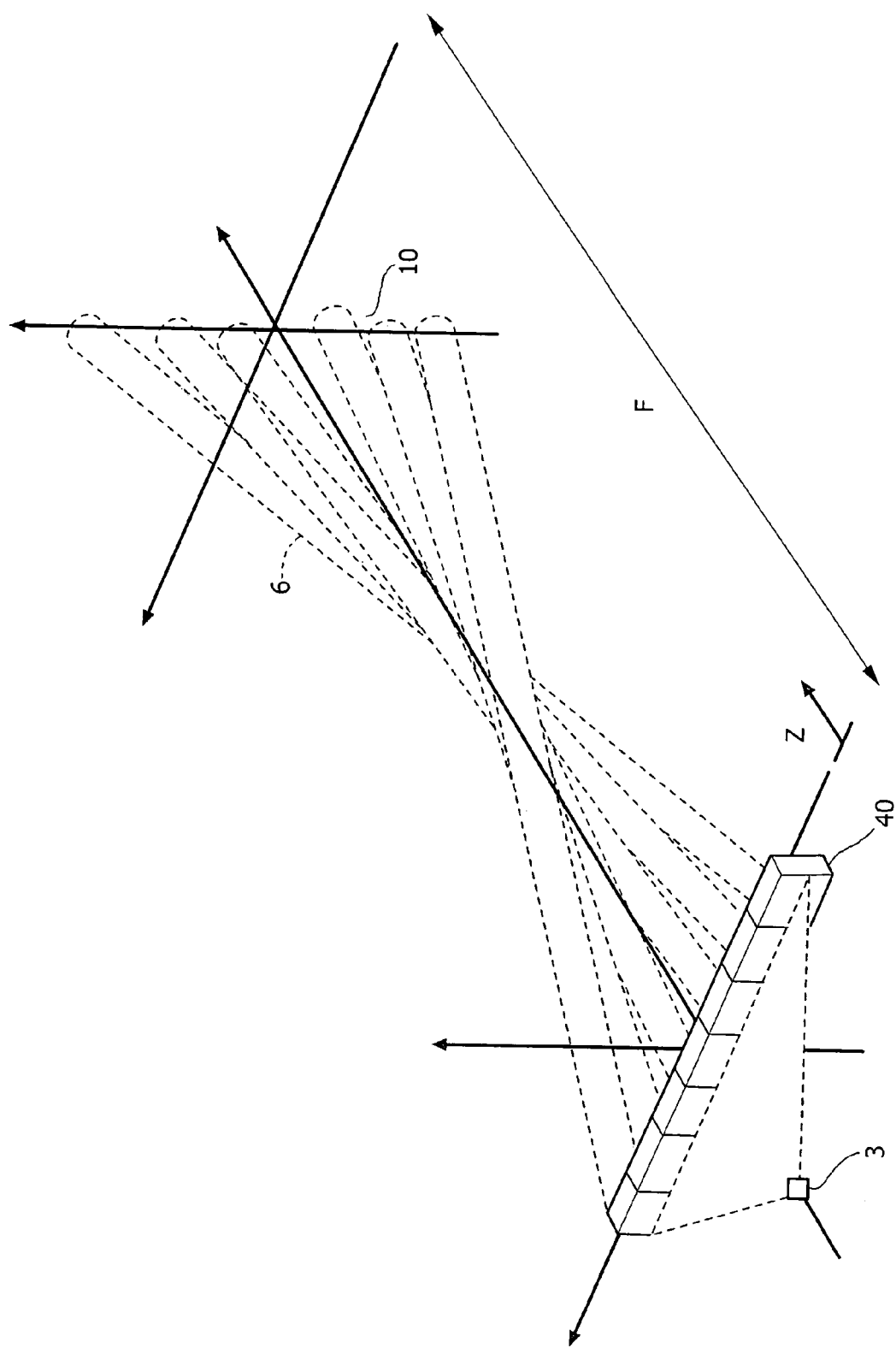
FIG. 6 shows a variant of FIG. 5 in which the optical means 40 may directly perform the function of collimating the radiation emitted from different points of the source in different directions so as to form an outgoing beam 6 with the characteristics necessary for the device according to the invention.

FIG. 6 shows the variation of the angle of inclination α as a function of the distance for a case in which the segment of light is vertical at a distance of 30 m from the source, the horizontal dimension of the source is 20 cm and the dimension of the vertical segment at a distance of 30 m is 50 cm.

With regard to the acquisition system 8, the operating principle for measuring the angle of inclination α of the segment 10 with regard to the vertical in general consists in acquiring, with a matrix of photodetectors, the image of the obstacle 5 so as to detect the segment of light 10, emitted by the matrix of sources 3 and projected onto the obstacle, and calculating the angle of inclination α with respect to the vertical, using image processing algorithms. This method may be actuated with a matrix of photodetectors, for example with a video camera based on CCD and CMOS technology, utilising an arrangement of lenses of appropriate focal length to focus the radiation. Furthermore, for the means of acquisition, different alternative solutions are provided for.

In a first solution, a photodetector (pixel) is used above which are situated a diaphragm and optics capable of resolving the shape of the segment of light, and thus also the angle of inclination α. The diaphragm has the form of a slit reproducing the segment of light with a predetermined angle of inclination α. In this way, whenever the segment of light has an angle of inclination equal to that reproduced by the diaphragm, there is maximum signal with regard to that which would be obtained with different angles of inclination. This method presents marked advantages with regard to the computational load for image acquisition and processing and to the electronics; however, not knowing the reflectance of the obstacle beforehand, it is not possible to distinguish a segment with an angle of inclination equal to that of the diaphragm, reflected by an obstacle with a poorly-reflecting surface, from a segment with angle of inclination different from that of the diaphragm, reflected by an obstacle having a highly reflective surface ("co-operative" obstacle). A solution to eliminate this ambiguity consists in having a measure of the reflectance of obstacles that may be obtained for example utilising an additional source, with emission wavelength the same as that of the matrix of sources 3, to project a substantially collimated and very narrow beam in the angular direction corresponding to the centre of the obstacle and acquiring from it a signal with a photodetector, said signal being proportional to the reflectance of the obstacle 5.

Figure 10:
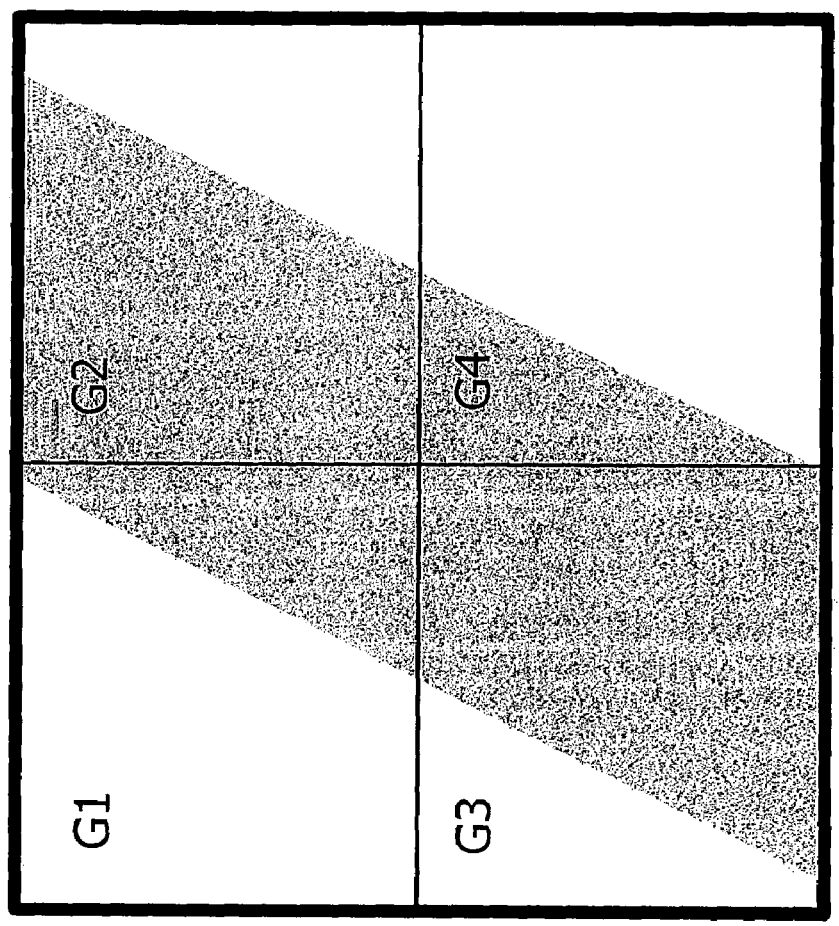
FIG. 10 shows a matrix of photodetectors (2×2) on which a segment of light 10 is focused. The signals collected on the four photodetectors are indicated with G1, G2, G3 and G4.

In a second solution, a matrix of photodetectors comprising a Region of Interest (RoI) is used for acquisition, above which is situated optics (an arrangement of lenses) for focusing the image. The angle of incidence α of the segment 10 is calculated by means of image processing algorithms. The minimum number of photodetectors is 2×2, whereas a value of 10×10 may be considered typical; in general, the larger is the number of photodetectors, the greater is the accuracy with which it is possible to extrapolate the inclination of the segment. The number of photodetectors determines the accuracy in calculating the angle of incidence α. In the case in which the number of photodetectors is 2×2, the incident signals respectively on the photodetectors 1, 2, 3 and 4 constituting the matrix 2×2 being G1, G2, G3 and G4, a possible method to calculate the angle of inclination α consists in calculating the relative weights of these signals so as to extrapolate the inclination of the straight line. To discriminate the lack of uniformity of the signals G1, . . . , G4 due to the difference in illumination incident on the photodetectors 1, . . . 4, one proceeds, with a differential technique, to subtract the background signal when the segment 10 is not projected onto the obstacle 5; in this way the relative weight of the signals G1, . . . G4 is exclusively due to the portions of segment of light 10 that fall on the different detectors comprising the 2×2 matrix. With reference to FIG. 10, the angle of inclination is determined as follows: G2/G1=G4/G3 segment 10 is to be considered vertical. G2/G1>0 and G4/G3<0 segment 10 is inclined to the right. G2/G1<0 and G4/G3>0 segment 10 is inclined to the left. From the exact values of these ratios it is possible to extrapolate quantitative information on the inclination of the segment 10.

All the methods described above may be generalised to the case in which a plurality of segments of light 10 are projected, as described below, provided that the single photodetector and the single RoI are replaced with a matrix of photodetectors and/or a matrix of RoIs.

Lastly, a further acquisition method, applicable only to the case of projection of a single segment 10, consists in utilising a matrix of single photodetectors (pixels) onto which diaphragms with slits reproducing the segment of light are placed, each having a different angle of inclination α.

The angle of inclination of the segment 10 is determined by comparing the signal acquired by the single photodetectors: the strongest signal is that equipped with a diaphragm whose slit reproduces the angle of inclination 10.

This method, being of the comparative type, has the advantage, with regard to the method (I), of not requiring the reflectance of the obstacle 5 to be estimated. The method described above requires the use of image formation optics of the type with a matrix of microlenses, each microlens being associated to a single pixel and producing on the respective pixel the same image of the segment of light 10.

Figure 11:
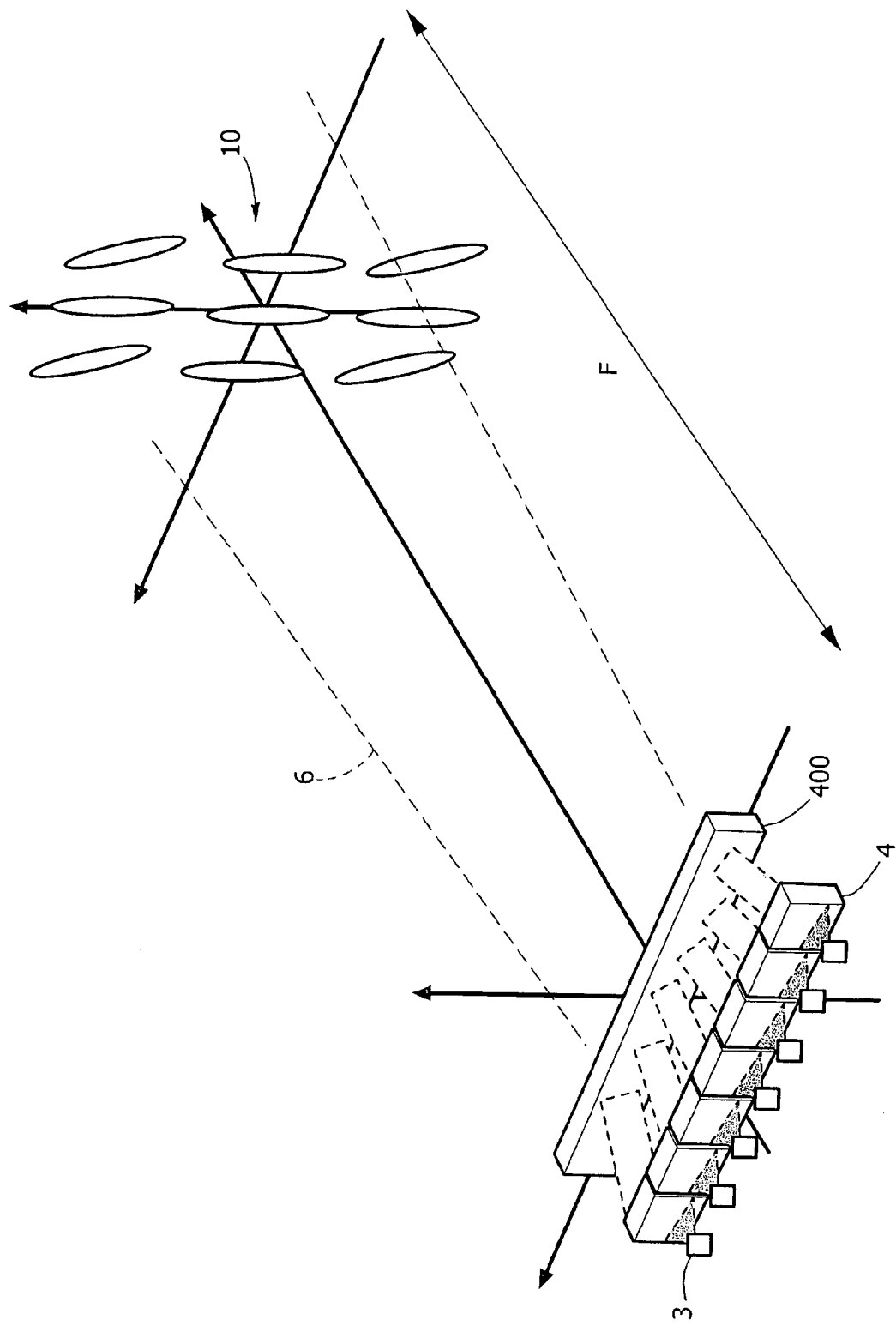
FIG. 11 shows dedicated optics 400, positioned in front of the matrix of sources 3 with relative collimator optics and beam deviators 4, such as to multiply the vertical segments of light 10.

In order to apply the measurement principle described above to automobile-related applications that provide for monitoring the scene with a significant field of view, for example with a FOV of 32°×24°, and with a resolution (or instantaneous field of view, IFOV) for example of 0.1 degrees (for example necessary to resolve an object of 20 cm at a distance of 50 m), it is necessary to have a distribution of many vertical segments of light, at a distance one from the other so as to uniformly cover the field of view at the maximum measurable distance. For this purpose, dedicated optics 400 may be used (FIG. 11), positioned in front of the matrix of sources 3 with the relative beam collimator and deviator optics (4 or 40), so as to multiply the vertical segments of light 10. The dedicated optics may be of the holographic or diffraction type.

With reference to this latter methodology, the angular resolution and the wavelength are determined so as to fix the period of the grid univocally, whereas the overall field of view and the angular resolution are fixed so as to determine univocally the number of orders of diffraction into which it is intended to concentrate the light, appropriately distributed in a uniform manner.

Figure 12:
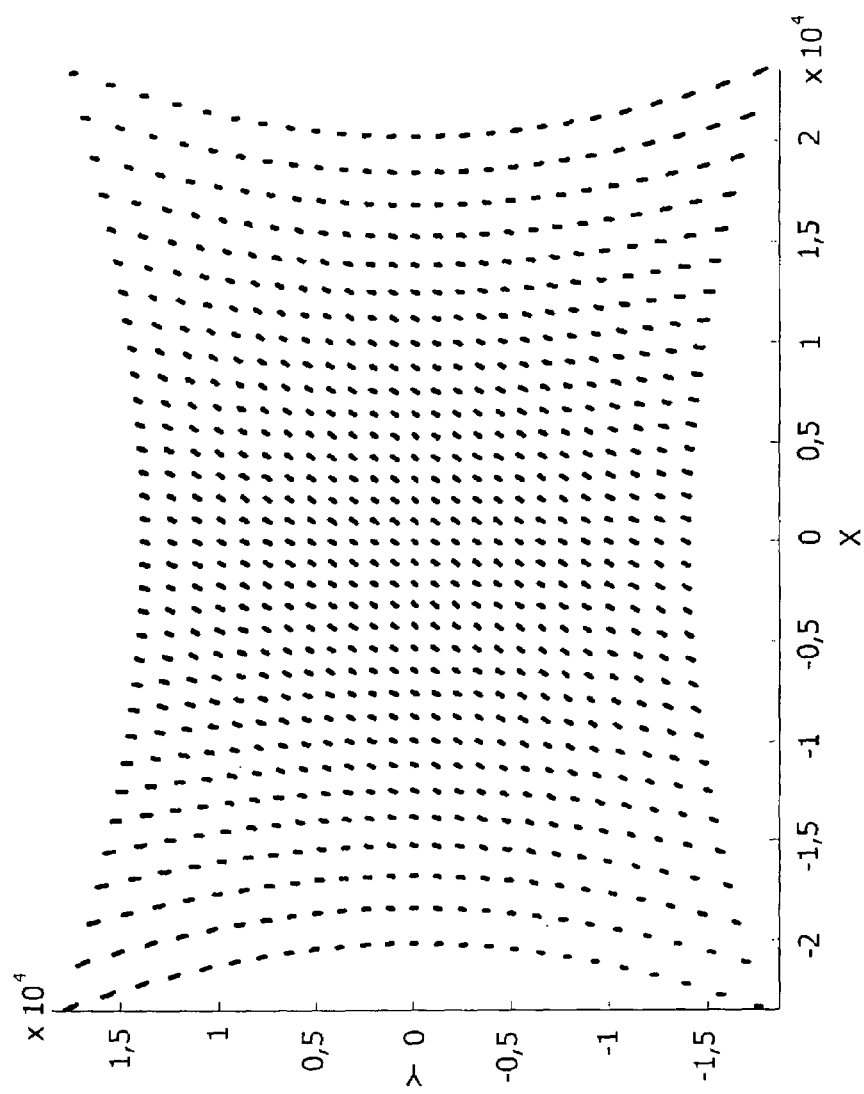
FIG. 12 shows, in a simulation, the distribution of segments of light, intercepted by an obstacle at a distance of 30 m from the emission unit, in a field of view of 32°×24°; said segments may be generated for example by using a diffraction grid in front of the source of the single segment, this grid having the effect of multiplying said segments into a number of segments corresponding to the diffraction order of the grid.
Figure 13:
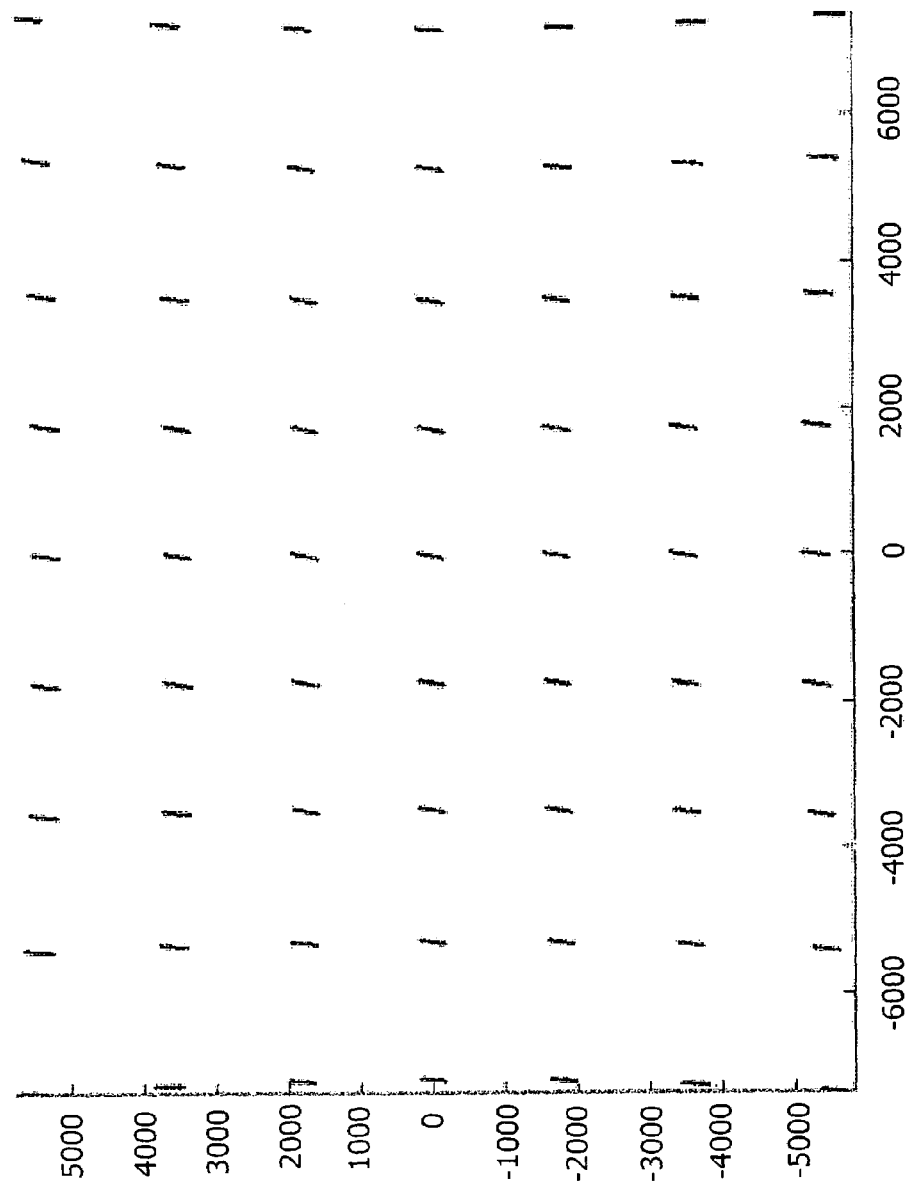
FIG. 13 is a representation of the same light distribution as FIG. 12, in diagram form.
Figure 14:
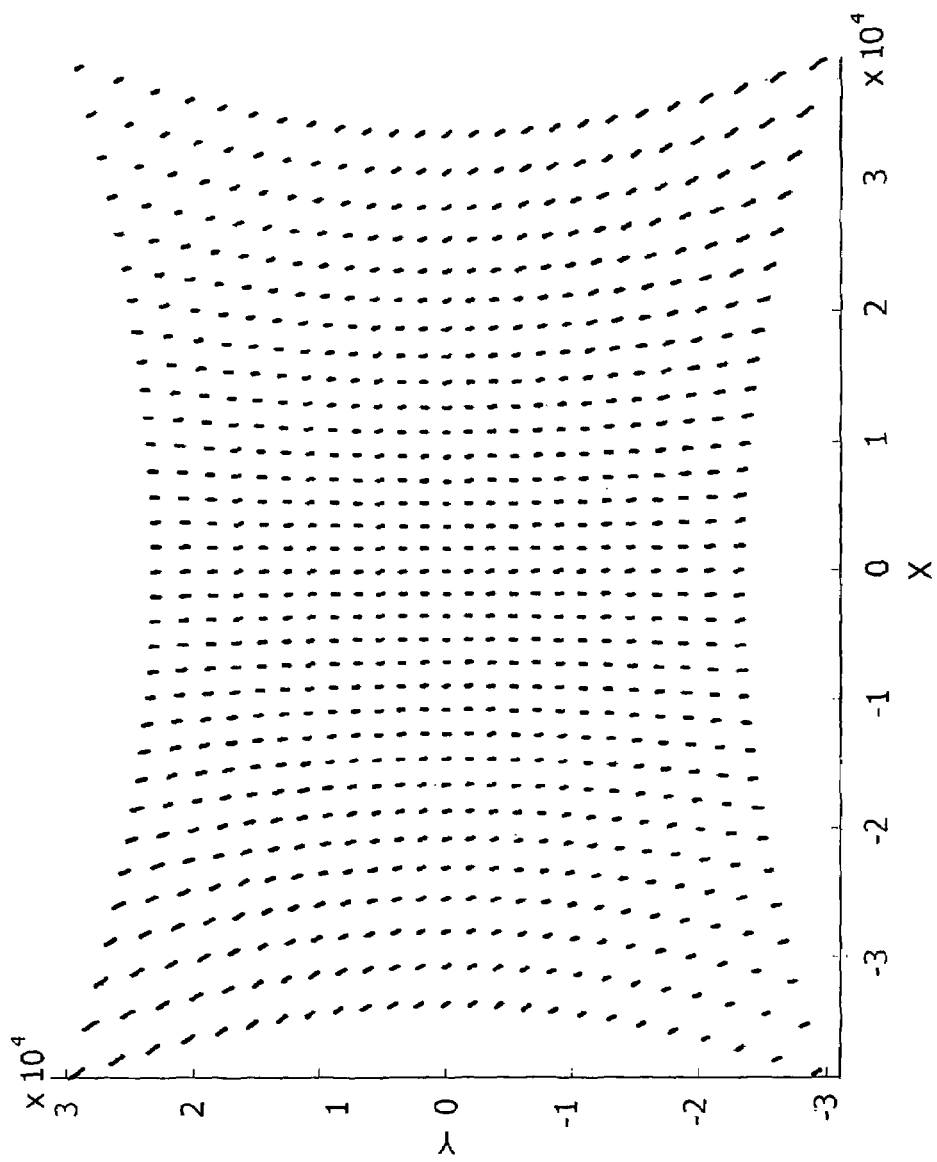
FIG. 14 shows, in a simulation, the distribution of segments of light at a distance of 50 m, in a field of view of 32°×24°, generated by diffraction optics.
Figure 15:
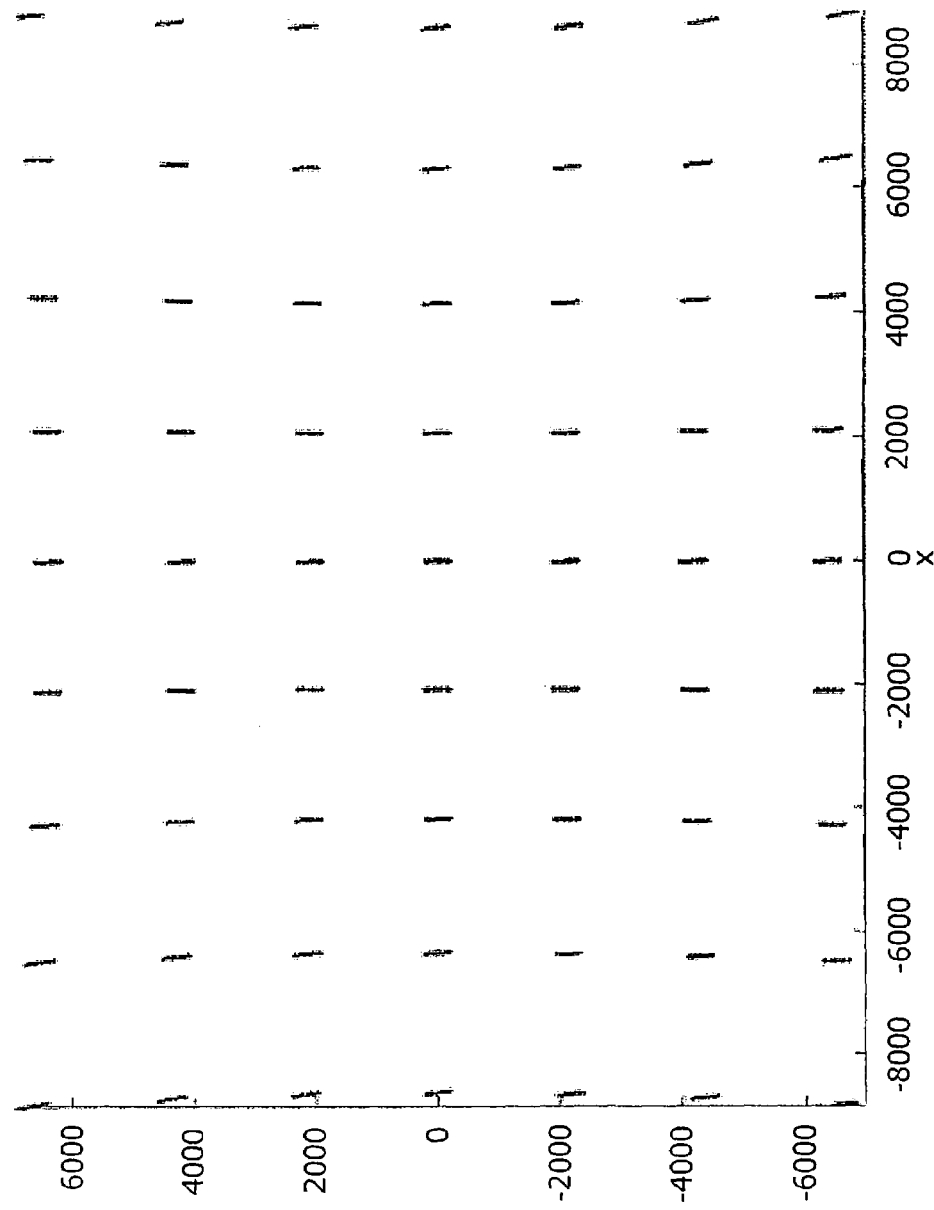
FIG. 15 shows the same light distribution as FIG. 14, in diagram form.
Figure 16:
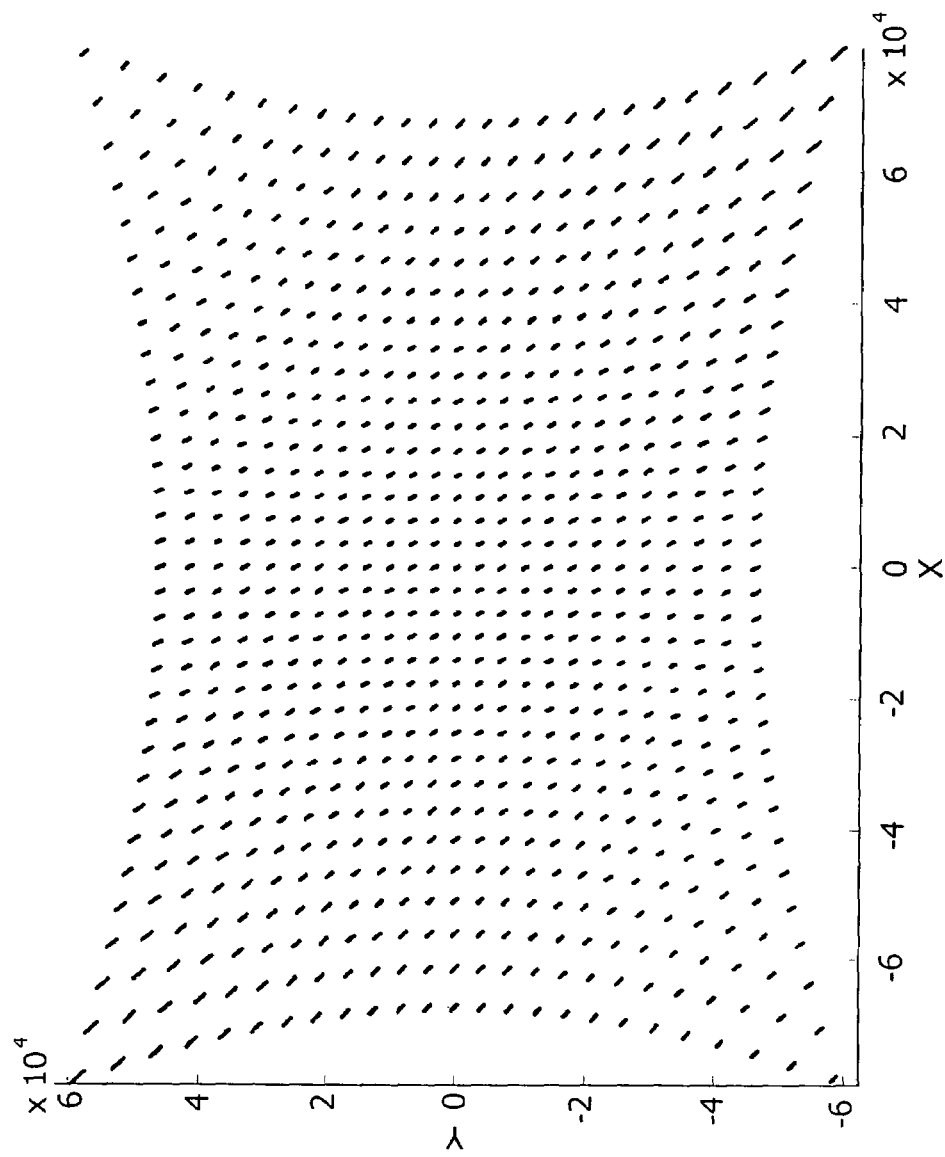
FIG. 16 shows, in a simulation, the distribution of segments of light at a distance of 100 m, in a field of view of 32°×24°, generated by diffraction optics.
Figure 17:
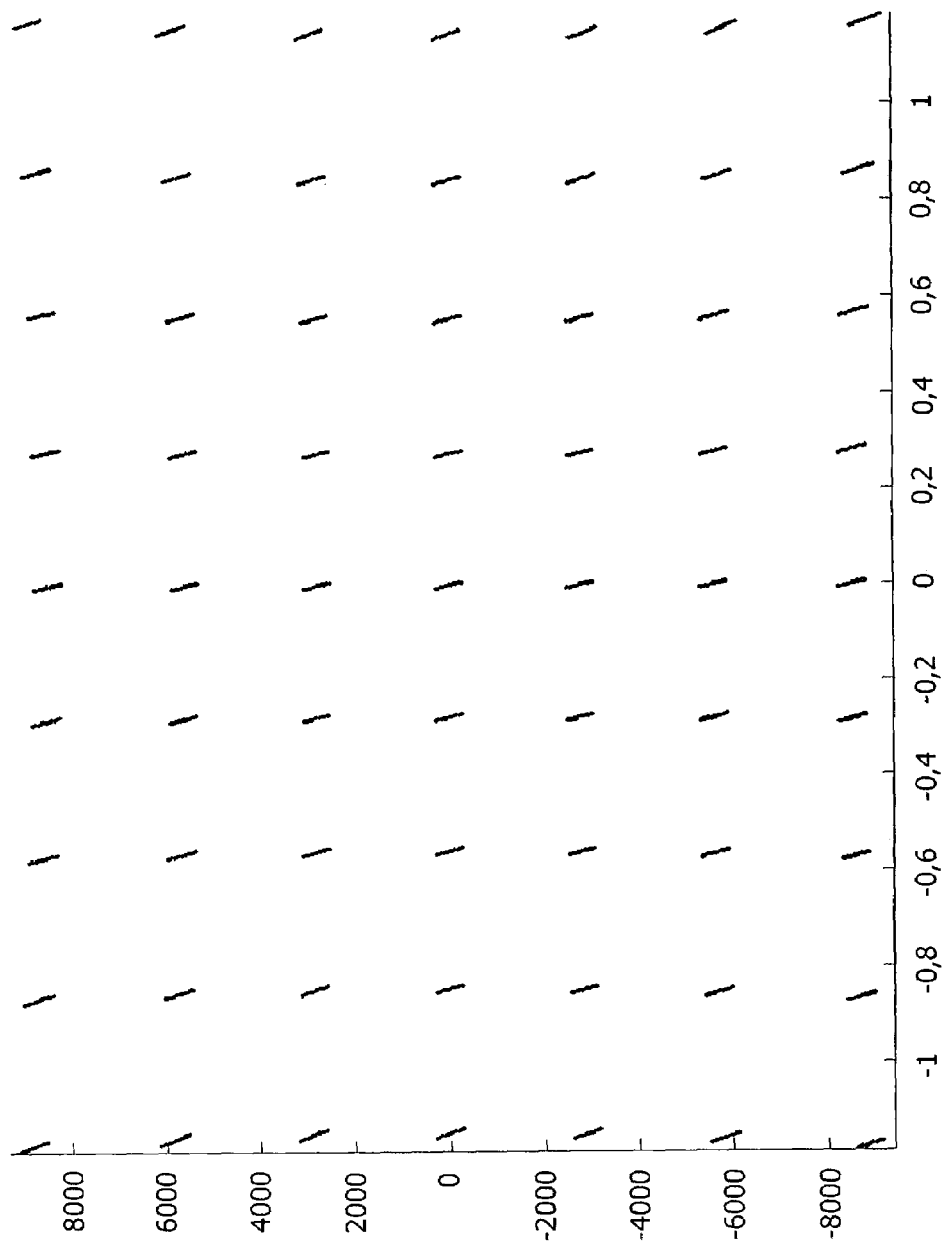
FIGS. 17 shows the same distribution of light as FIG. 16, in diagram form.
Figure 18:
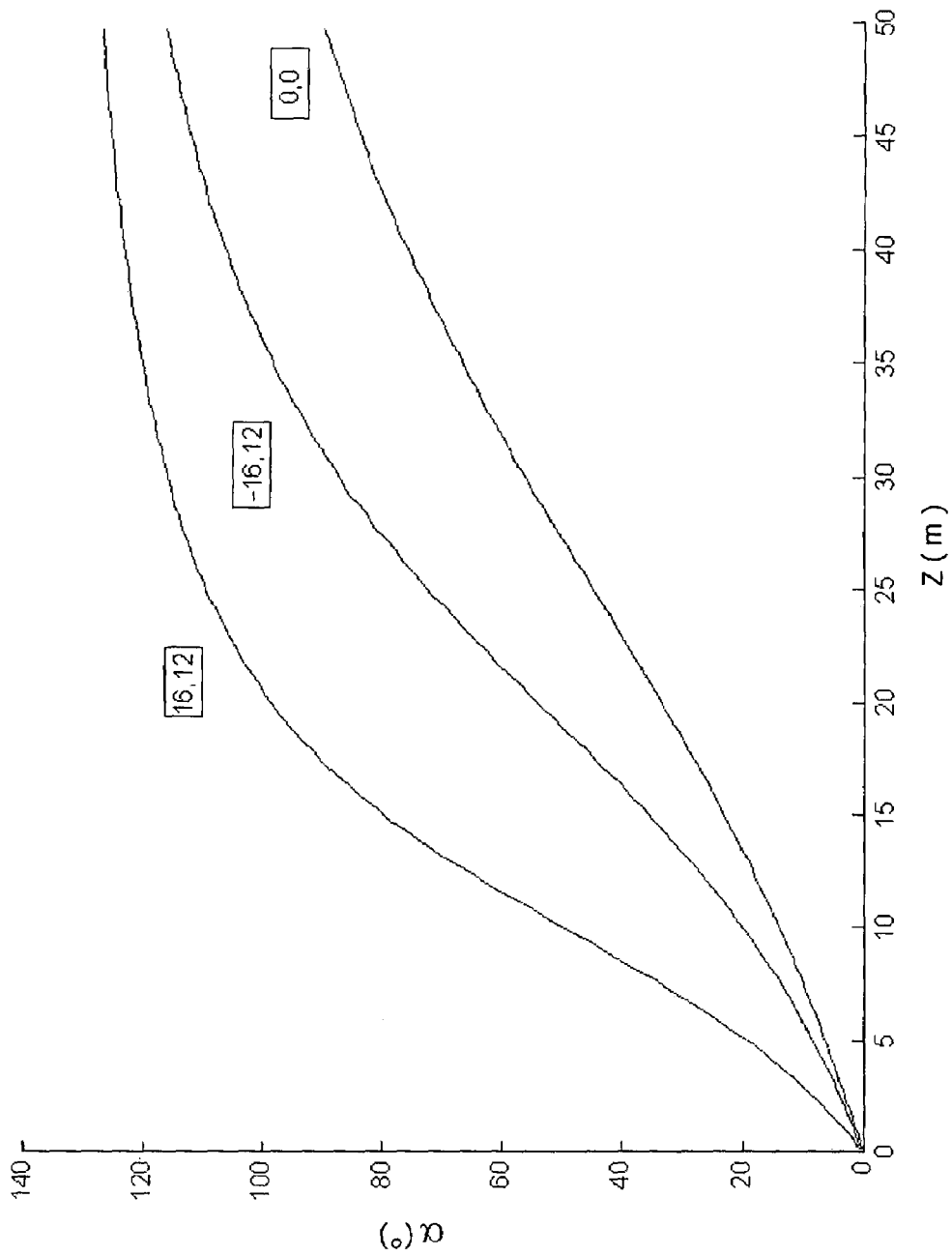
FIG. 18 is a diagram showing the variation of said angle of inclination as a function of the distance, for some specific segments of FIGS. 7-9, in the case of a vertical line situated at 50 m and of a distribution of segments equal to 16×12.

FIGS. 12, 14 and 16 show the simulated distribution of segments of light with diffraction optics, in which the number of orders of the matrix is 16 horizontally and 12 vertically, the field of view is 32°×24°, the length of the matrix of sources is 40 cm, the dimension of the vertical line is 40 cm at a distance of 50 m. As may be seen in FIGS. 13, 15 and 17, to determine the inclination of the segments, it must be taken into account that, for a given distance 17, as the distance from the central axis increases the lines become inclined as a function of the displacement angle, a phenomenon known as conical diffraction. This means that, in order to calculate the distance, this phenomenon, introduced by the diffraction optics, must be taken into account. As may be seen in FIG. 18, the trend of the angle of inclination α of the segments varies as a function of the distance and is different for segments of different orders, but can be deduced beforehand. The diagram illustrates the variation for the segment corresponding to order 0,0, positioned on the axis of the matrix of sources, as well as the variations for the segments corresponding to orders 16,12 and −16,12, which are generated at the extremities of the field of view.

All of the above is based on the presumption that the matrix of sources has a single dimension extended horizontally and that the transverse section of the beam irradiated from the sources has a vertical dimension at a predetermined distance. A similar reasoning may be applied considering a matrix of sources with a single dimension extending vertically capable of producing segments of light with horizontal dimension at a predetermined distance.

Furthermore, depending on the type of application, it is possible to adapt the technology subject of this patent. For example, in the case of automobile-related applications, the device may be integrated into the front part of the vehicle, above the bumper, for example in the radiator grill, with a number of matrices of sources with dimension extending horizontally (for a total for example of one meter) capable of generating a number of vertical segments of light distant one from the other in such a manner as to uniformly cover, at 50 m, a specific field of view.

The beam of light may be conformed such that it gives rise to a transverse section including of a different shape than that of a segment, for example an elliptical or similar shape, that is in any case extended along a principle axis, or any other shape that enables its orientation to be determined.

Naturally, the principle of the invention holding good, construction details and embodiments may vary widely with regard to what is described and illustrated as a simple example, without thereby departing from the sphere of the present invention.

What is claimed is:

1. Optical device for measuring the distance from an obstacle, including:

a unit to emit a radiation and to conform the irradiated beam, an acquisition unit to acquire information relating to the image of the scene situated in front of said optical device, an electronic control and processing unit to receive signals leaving said acquisition unit in order to determine the distance between said optical device and an obstacle which is part of the scene in front of the optical device, wherein said emission unit is predisposed to emit a beam having a transverse section of a form elongated along an axis, said axis being progressively rotated for transverse sections of the beam progressively more distant from the emission unit, in such a manner that the distance of the optical device from one or more obstacles illuminated by the beam is calculated by said electronic control and processing unit as a function of the angular position of said axis on the section of the beam intercepted by the obstacle, as acquired by said means of acquisition.

2. Optical device according to claim 1, wherein said unit for the emission of radiation consists of a linear matrix of sources arranged along a predetermined axis.

3. Optical device according to claim 2, wherein the sources are laser diodes.

4. Optical device according to claim 3, wherein said laser diodes have emission peak in the region of the spectrum of the near infrared.

5. Optical device according to claim 2, wherein said sources are light emitting diodes (LEDs).

6. Optical device according to claim 5, wherein said light emitting diodes have emission peak in the region of the spectrum of the near infrared.

7. Optical device according to claim 1, wherein said unit for the emission of radiation comprises a single source extended in one direction, for example a horizontal or a vertical direction.

8. Optical device according to claim 7, wherein said single extended source has emission peak in the region of the spectrum of the near infrared.

9. Optical device according to claim 1, wherein said unit for emission and conformation of the beam comprises a plurality of arrangements of lenses, each of said arrangements of lenses being combined with a single light source, said arrangements of lenses being capable of collimating and guiding a beam having a transverse section of a form elongated along an axis, said axis being progressively rotated for transverse sections of the beam that are progressively more distant from the emission unit.

10. Optical device according to claim 1, wherein said unit for emission and conformation of the beam comprises a plurality of lenses, each of said lenses being combined to a single light source, said lenses being capable of coordinating and guiding a beam having a transverse section of a form elongated along an axis, said axis being progressively rotated for transverse sections of the beam progressively at a greater distance from the emission unit.

11. Optical device according to claim 1, wherein unit for emission of radiation comprises a single source of radiation of the point-form type coupled to optical means, capable of extending the dimension of the source along a predetermined axis and of collimating the light emitted by said source in a direction substantially perpendicular to said linear dimension, and to further optical means capable of forming an outgoing beam according to the characteristics of claim 1.

12. Optical device according to claim 1, wherein said unit for the emission of radiation comprises a single source of radiation of the point-form type coupled to optical means capable of extending the dimension of the source along a predetermined axis and of forming an outgoing beam (6) according to the characteristics of claim 1.

13. Optical device according to claim 1, in which said acquisition unit comprises one or more photodetectors whose field of view comprises the scene situated in front of the optical device.

14. Optical device according to claim 11, wherein said control and processing unit is predisposed to acquire the signals leaving said acquisition unit and to recognise the form of said section of the beam intercepted by said one or more obstacles through image recognition algorithms, as well as to calculate the distance between said optical device and said one or more obstacles included in the field of view of said acquisition unit.

15. Optical device according to claim 1, wherein said control and processing unit is predisposed to synchronise the emission of radiation from said emission unit with said acquisition unit in order to increase the ratio between useful signal and background signal, as well as the ratio between signal and noise.

16. Optical device according to claim 1, wherein said acquisition unit includes means to filter the radiation reflected from the obstacles and incident on said acquisition means so as to transmit only the components of the spectrum corresponding to the radiation emitted from said emission unit, in order to increase the ratio between useful signal and background signal, as well as that between signal and noise.

17. Optical device according to claim 13, wherein said acquisition unit comprises a single photodetector, a diaphragm and optics capable of forming an image of said section of the beam intercepted by said obstacle on said photo detector.

18. Optical device according to claim 13, wherein said acquisition unit comprises a matrix of photodetectors and optics (an arrangement of lenses) capable of forming an image of said section of the beam intercepted by said obstacle on said matrix of photodetectors.

19. Optical device according to claim 13, wherein said acquisition unit comprises a matrix of photodetectors, a diaphragm and optics (an arrangement of lenses) capable of forming an image of said section of the beam intercepted by said obstacle on said matrix of photodetectors.

20. Optical device according to claim 13, wherein said acquisition unit comprises a matrix of single photodetectors (pixels), to each of which is associated a diaphragm, said diaphragm consisting of a slit of a substantially linear form with axis arranged along a different predetermined direction for each of said pixels, and optics capable of forming an image of said section of the beam intercepted by said obstacle on the pixel associated to it.

21. Optical device according to claim 1, wherein said radiation unit is predisposed to emit a number of beams in different directions in space, each of said beams having a transverse section of a form elongated along an axis, said axis being progressively rotated for transverse sections of the beam progressively more distant from the emission unit.

22. Optical device according to claim 21, wherein to each of said beams is associated a photodetector or a matrix of photodetectors, according to any of the claims 17, 18, 20.

23. Optical device according to claim 1, in which the sensitive area of each of said detectors is of a linear form and extended along an axis oriented in a predetermined manner.

24. Optical device according to claim 18, wherein said control and processing unit is predisposed to calculate the distance of said obstacle by detecting the intensity of the signals associated to different pixels and comparing them one to another.

25. Optical device according to claim 18, wherein said matrix of photodetectors is a 2×2 matrix.

26. Optical device according to claim 18, wherein said matrix of photodetectors is 3×3 matrix.

27. Optical device according to claim 20, wherein said control and processing unit is predisposed to acquire the signal leaving said acquisition unit, to determine the pixel that generates the greatest light intensity and to associate to said determined pixel a distance value between said optical device and an obstacle.

28. Optical device according to claim 21, in which said unit to emit and conform the beam comprises optical means positioned downstream of the means to conform the beam and capable of multiplying the light distribution formed by said means to conform the beam.

29. Optical device according to claim 28, wherein said optical means comprises a diffraction grating.

30. Optical device according to claim 28, wherein said optical means is manufactured through optical holography.

31. Optical device according to claim 28, wherein said control and processing unit is predisposed to extrapolate the distance measurement on the basis of an a priori knowledge of the angle of inclination of the segment, determined by the conical diffraction effect.

32. Method to measure the distance of an obstacle, in which:
- a unit is predisposed to emit radiation and to conform the irradiated beam,
- the image in front of said emission unit is acquired,
- the distance between said emission unit and an obstacles part of the scene thus acquired is calculated,
- wherein the beam emitted by said emission unit is conformed in such a manner as to have a transverse section of a form elongated along an axis that is progressively rotated for transverse sections of the beam progressively more distant from the emission unit,
- in such a manner that the distance of the emission unit from an obstacle illuminated by the beam is calculated as a function of the angular position of the section of beam intercepted by the obstacle.

\* \* \* \* \*